(12) United States Patent
Bailey

(10) Patent No.: US 7,516,939 B2
(45) Date of Patent: Apr. 14, 2009

(54) DUAL DETECTION SENSOR SYSTEM FOR WASHROOM DEVICE

(75) Inventor: Robert William Bailey, Mossley (CA)

(73) Assignee: Masco Corporation of Indiana, Indianapolis, IN (US)

( * ) Notice: Subject to any disclaimer, the term of this patent is extended or adjusted under 35 U.S.C. 154(b) by 797 days.

(21) Appl. No.: 11/011,410

(22) Filed: Dec. 14, 2004

(65) Prior Publication Data

US 2006/0124883 A1 Jun. 15, 2006

(51) Int. Cl.
*F16K 31/02* (2006.01)
(52) U.S. Cl. ................ 251/129.04; 4/623; 250/221
(58) Field of Classification Search ............ 251/129.04; 4/304, 313, 623; 250/221
See application file for complete search history.

(56) References Cited

U.S. PATENT DOCUMENTS

| 5,217,035 A | 6/1993 | Van Marcke |
| 5,224,685 A | 7/1993 | Chiang et al. |
| 5,313,673 A * | 5/1994 | Saadi et al. ............... 4/313 |
| 5,459,944 A | 10/1995 | Tatsutani et al. |
| 5,482,250 A | 1/1996 | Kodaira |
| 5,781,942 A * | 7/1998 | Allen et al. ............... 4/623 |
| 5,819,336 A | 10/1998 | Gilliam et al. |
| 5,915,417 A | 6/1999 | Diaz et al. |
| 5,979,500 A | 11/1999 | Jahrling et al. |
| 6,250,601 B1 | 6/2001 | Kolar et al. |
| 6,598,245 B2 | 7/2003 | Nishioka |

* cited by examiner

*Primary Examiner*—John K Fristoe, Jr.
(74) *Attorney, Agent, or Firm*—Leon E. Redman; Carlson, Gaskey & Olds

(57) ABSTRACT

A detection system for a washroom device evaluates outputs from an active sensor and a passive sensor to determine whether to activate the device (e.g., operate a valve in a sink or a lavatory). The active sensor has a transmitter that directs a light beam to a selected zone and a receiver that detects whether the light beam is reflected back to the sensor. The passive sensor detects changes in a temperature signature around the washroom device. A controller evaluates the outputs from both the active sensor and the passive sensor to determine how to operate the washroom device.

17 Claims, 3 Drawing Sheets

US 7,516,939 B2

DUAL DETECTION SENSOR SYSTEM FOR WASHROOM DEVICE

TECHNICAL FIELD

The present invention relates to sensor systems for washroom devices.

BACKGROUND OF THE INVENTION

Automatically operable touchless washroom devices, such as lavatories and sinks, are becoming increasingly common, particularly in facilities having public washrooms. Touchless washroom devices allow users to avoid touching contaminated surfaces to operate the devices. These devices usually incorporate one or more sensors that detect a person's location and/or movements. A control system then operates a valve or other washroom device component based on the sensor output.

Currently known touchless devices incorporate different kinds of sensors. Active sensors, such as active infrared (IR) sensors, may be used to sense the presence of a person near the washroom device by transmitting a light beam (e.g., an IR beam) and detecting whether the beam is reflected back to the sensor. If a person is near the sensor, the light beam will reflect off of the person's clothing back to the sensor. Different materials and different surface textures, however, reflect light in widely varying different ways. For example, shiny fabrics tend to reflect light more than matte fabrics. Some fabrics even tend to absorb light, making it difficult for an active sensor to detect the presence of a person at all. Moreover, various surfaces, such as shiny tile, tend to reflect light beams back to the sensor, potentially causing the sensor to erroneously detect the presence of a person near the washroom device.

Although systems incorporating two or more sensors are known in the art, these systems either use different sensors to sense a person's presence at different zones and/or distances, to detect a person's presence in different types of light conditions (e.g., high ambient light vs. low ambient light), or to reduce energy consumption by using one sensor to determine whether to activate another sensor. The actual operation of the washroom device, however, still depends on the output of a single sensor in currently known systems, making them susceptible to the inherent operational weakness of the sensor. As a result, the washroom device will not engage accurately, causing either wasted water due to unnecessary device operation and/or user inconvenience due to the failure of the device to operate when needed.

There is a device for a detection system that can detect the presence and absence of a person near the washroom device in a more accurate manner.

SUMMARY OF THE INVENTION

The invention is generally directed to a detection system for a washroom device that evaluates outputs from two different types of sensors in determining whether to activate the device (e.g., operate a valve in a sink, a lavatory, a urinal, etc.). One sensor is an active sensor having a transmitter and a receiver. The transmitter directs a light beam to a selected zone and the receiver detects whether the light beam is reflected back to the sensor. The other sensor is a passive sensor that can detect changes in a heat signature around the washroom device.

A controller evaluates the outputs from both the active sensor and the passive sensor to determine when to engage a system that operates the washroom device. More particularly, the controller decides whether or not to operate the washroom device based on the combined outputs of the two sensors rather than on the output of either sensor alone. By considering the active and passive sensor outputs together rather than relying on outputs from only one type of sensor, the inventive system provides more robust detection capabilities, ensuring proper operation of the washroom device.

These and other features of the present invention can be best understood from the following specification and drawings, the following of which is a brief description.

DETAILED DESCRIPTION OF THE PREFERRED EMBODIMENT

Figure 1A:
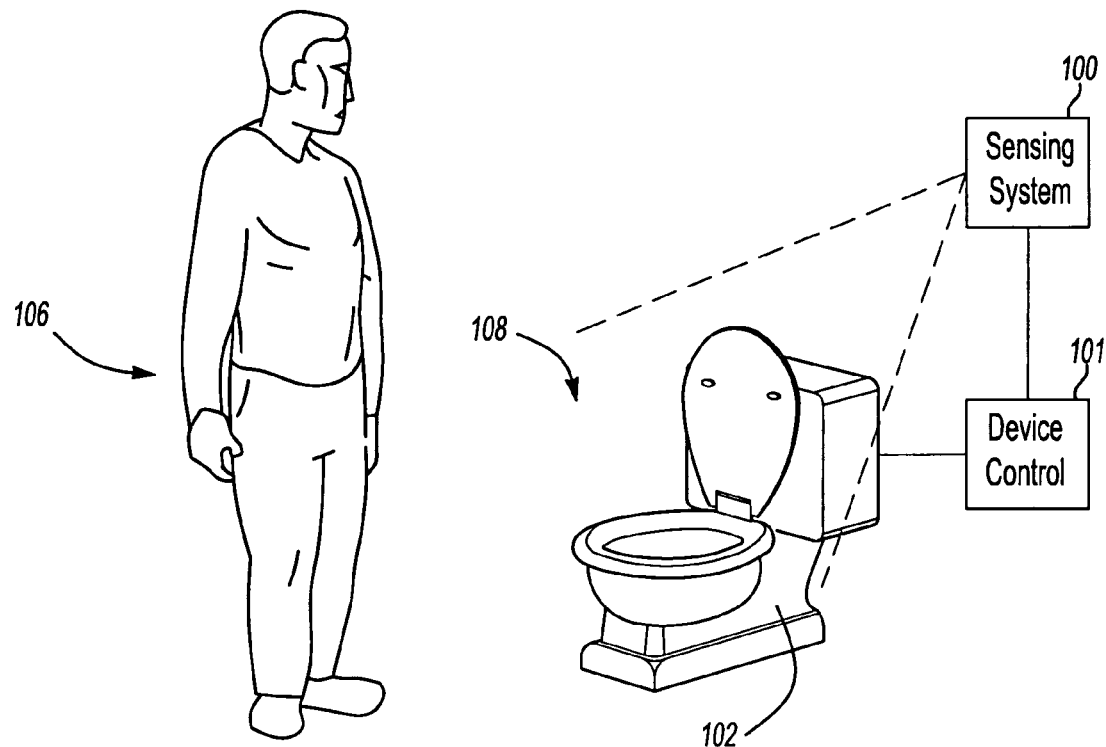
FIGS. 1A and 1B are representative diagrams of washroom devices incorporating a sensing system according to one embodiment of the invention.
Figure 1B:
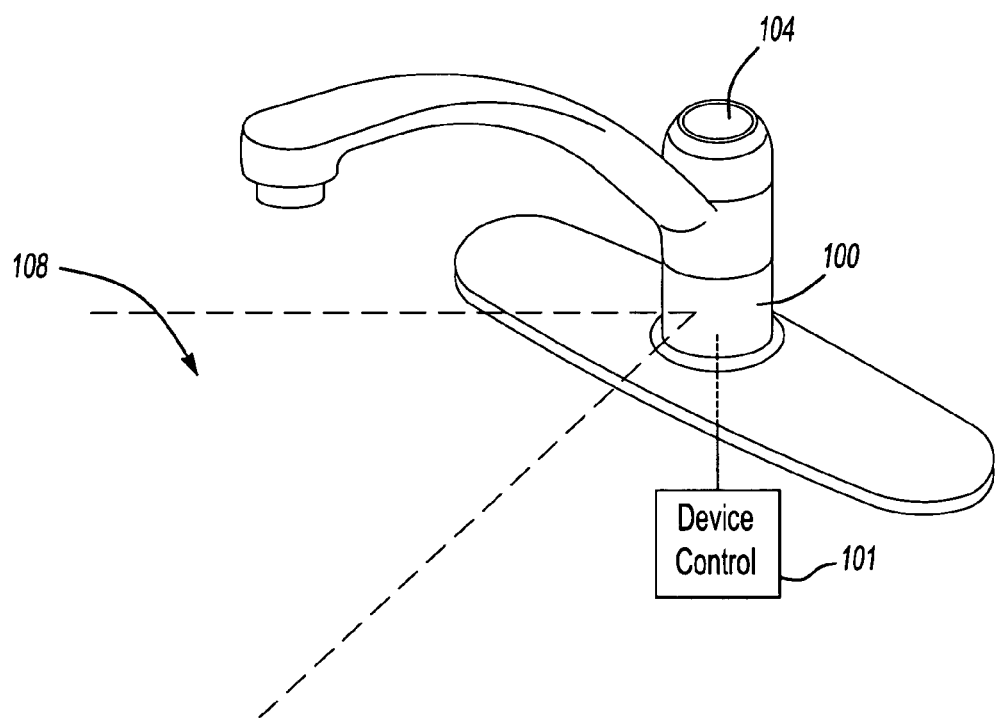

FIGS. 1A and 1B illustrate examples of possible washroom devices that can incorporate a sensing system 100 according to the invention. FIG. 1A illustrates a lavatory 102 and FIG. 1B illustrates a bathroom sink faucet 104, both of which include the inventive sensing system 100. As shown in the Figures, the sensing system 100 is positioned to detect the presence of a person 106 in an appropriate zone 108 of the washroom device. If the person 106 is detected, the sensing system 100 will engage a device control system 101, which causes the washroom device to operate appropriately. For example, if the sensing system 100 is used in a lavatory 102, a flush valve (not shown) in the lavatory 102 may be operated once the sensing system 100 senses that the person 106 has risen from a seated position. Similarly, if the sensing system 100 is used in the faucet 104, a valve (not shown) may allow water flow if it senses that the person's hands are positioned under the faucet 104 for hand washing.

Figure 2:
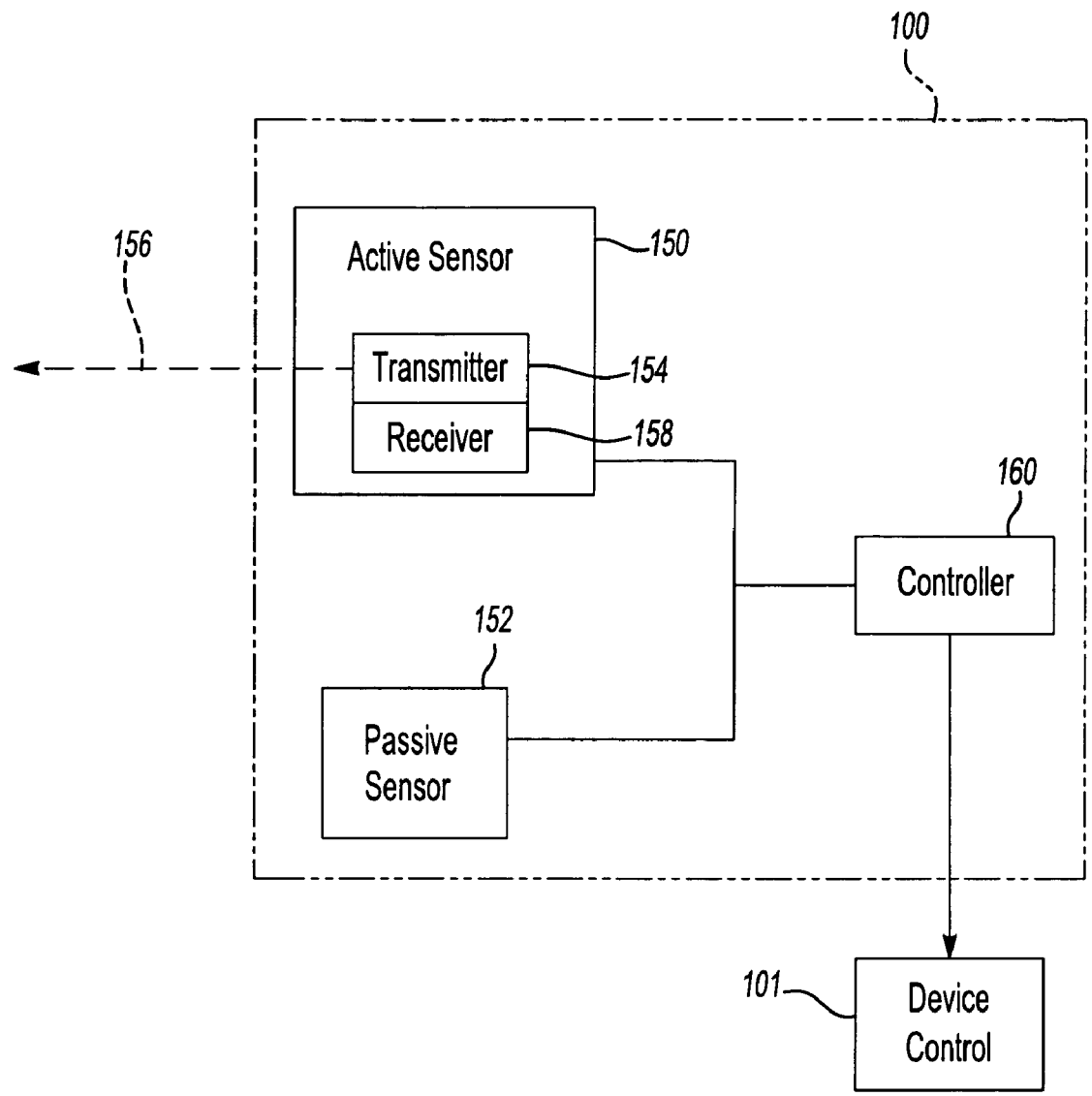
FIG. 2 is a block diagram illustrating the components of the sensing system.

FIG. 2 is a block diagram illustrating one example of the sensing system 100 itself. The sensing system 100 includes an active sensor 150, such as an active infrared (IR) or visible light sensor, and a passive sensor 152, such as a passive IR or visible light sensor. The active sensor 150 includes a transmitter 154 that transmits a beam 156 into the desired zone 108 and a receiver 158 for detecting whether the beam 156 is reflected back to the active sensor 150. If the person 106 is in the zone 108, the beam 156 will ideally be reflected off of the person 106 toward the receiver 158 as an active object detection signal.

As noted earlier, however, active sensors 150 experience some difficulty with accurate detection because different surfaces reflect light to different degrees. Some fabrics and finishes absorb light to such a large degree that very little of the beam 156 is reflected back to the receiver 158. As a result, the active sensor 150 will not detect the presence of the person 106 and therefore will not provide an output that will cause the washroom device to operate.

To remedy this problem, the inventive sensing system 100 incorporates the passive sensor 152, which operates in a different manner than the active sensor 150. Rather than transmitting a light beam, the passive sensor 152 detects the person 106 by detecting a change in a temperature signature of the zone 108 as a passive object detection signal. Thus, the passive sensor 106 will detect body heat when the person 106 is in the zone 108. However, there are other situations where temperature changes near the passive sensor 152 have nothing to do with the presence or absence of a person (e.g., when a hand dryer is turned on near the passive sensor 156).

To improve the detection accuracy of the sensing system 100, the system 100 includes a controller 160 that conducts a sensing decision from the outputs of both the active sensor 150 and the passive sensor 152 to determine whether or not to engage the device control system 101. The controller 160 causes the output of the sensing system 100 to be based on the combined outputs of two different types of sensors rather than a single sensor or a single sensor type. The outputs of the active sensor 150 and the passive sensor 152 therefore complement each other, where each sensor compensates for any shortcomings in the other sensor when the controller 160 makes the sensing decision.

Figure 3:
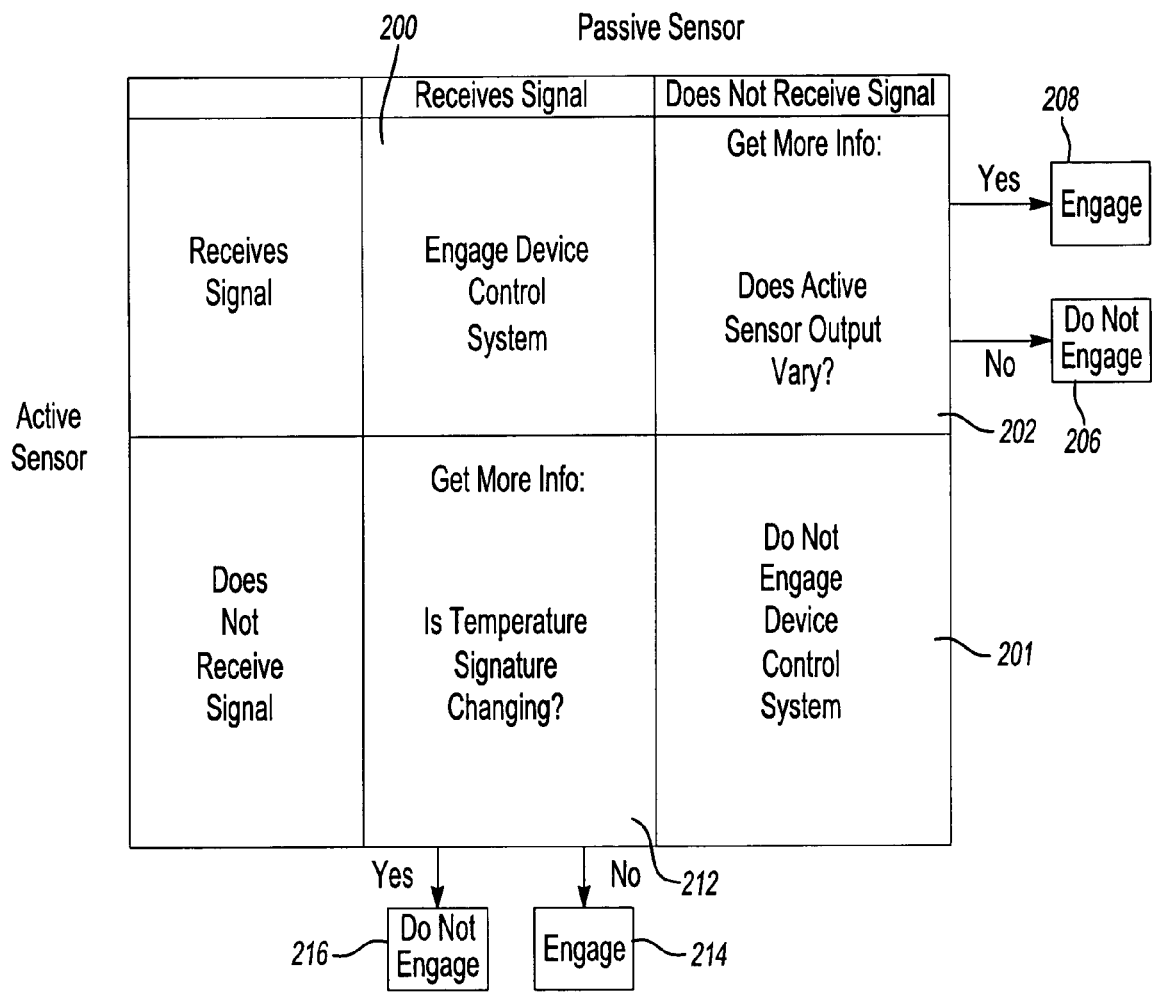
FIG. 3 is a table illustrating possible controller outputs for various combinations of sensor inputs.

FIG. 3 is a table illustrating one way in which the controller 160 conducts its sensing decision from the outputs from the active sensor 150 and the passive sensor 152. Note that other controller outcomes are possible depending on the desired application for the sensing system.

In this example, if both the active sensor 150 and the passive sensor 152 receive their respective object detection signals, indicating that a person 106 is present in the selected zone 108, then the controller 160 engages the device control system 101 (block 200). This will cause, for example, the flush valve in the lavatory 102 to flush or the valve in the faucet 104 to open and allow water flow. Conversely, if neither the active sensor 150 nor the passive sensor 152 receives the object detection signal, it indicates that there is no person 106 in the zone 108. Therefore the controller 160 does not engage the device control system 101 in this case (block 201).

If the active sensor 150 receives the active object detection signal but the passive sensor 152 does not receive the passive object detection signal, it indicates that the active sensor 150 detects a presence of an object in the zone 108 without any corresponding temperature change detectable by the passive sensor 152. In other words, the outputs of the active sensor 150 and the passive sensor 152 do not match. If this occurs, the controller 160 determines that more information is required (block 202).

In this example, the additional information is obtained by checking the output of the active sensor 150 to determine whether it is constant or varying. If the output from the active sensor 150 is constant and stable, then it is likely that the beam 156 detected by the receiver 158 in the active sensor 150 is being reflected from a stationary object in the zone 108 and not a person. The controller 160 therefore does not engage the device control system 101 (block 206). If there are significant variations in the active sensor 150 output, however, then it is more likely that the received beam 156 is being reflected off of the person 106. The controller 160 will therefore assume that the person 106 is present in this case and engage the device control system 101 to operate the washroom device (block 208).

Similarly, if the active sensor 150 does not receive the active object detection signal but the passive sensor 152 does receive the passive object detection signal, it indicates that the passive sensor 152 detects a change in the temperature signature without the active sensor 150 detecting a corresponding object in the zone 108. This may occur if the temperature signature change is caused by, for example, a nearby hand dryer. In this example, the controller determines that more information is needed (block 212).

In this example, the controller 160 checks the output of the passive sensor 152 for changes in the temperature signature.

If the temperature signature is constant, it is more likely that the person 106 is present in the zone 108. In this case, the controller 160 engages the device control system 101, causing the washroom device to operate (block 214). If the temperature signature is changing rapidly, however, it is more likely that the temperature signature change is caused only by abrupt temperature changes in the ambient air. In this case, the controller 160 will not engage the device control system 101 (block 216).

Using a dual detection mechanism to detect the presence of a person near a washroom device refines the detection process and avoids the problems inherent in current detection systems that rely only on one type of detector to trigger device operation. By incorporating two different types of sensors and operating them in a complementary manner, the inventive system takes advantage of the benefits of each of the sensors. The sensors improve sensing of a person in front of a washroom device by confirming a signal from the active sensor against a signal from the passive sensor. The sensors therefore increase the likelihood of properly activating the washroom device from a series of decisions based on the outputs from both of the sensors. Thus, using two different types of sensors detects an environmental condition more accurately, thereby ensuring that the device will be triggered accurately and appropriately.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A sensing system for a washroom device, comprising:
   an active sensor that detects a reflected beam in a zone;
   a passive sensor that monitors a temperature of the zone; and
   a controller that generates a sensing decision based on combined states of an active object detection signal from the active sensor and a passive object detection signal from the passive sensor, wherein the sensing decision controls operation of the washroom device, the sensing decision being utilized to actuate the washroom device, and a sensing decision to actuate the washroom device being made under certain conditions if one of the active object detection signal and the passive object detection signal is received, and in the absence of the other.

2. The sensing system of claim 1, wherein the active sensor is one selected from an active infrared sensor and an active visible light sensor, and wherein the passive sensor is one selected from a passive infrared sensor and a passive visible light sensor.

3. The sensing system of claim 1, wherein the controller engages a device control system that controls operation of the washroom device if the controller receives both the active object detection signal and the passive object detection signal, and wherein the controller does not engage the device control system if the controller receives neither the active object detection signal nor the passive object detection signal.

4. The sensing system of claim 3, wherein the controller checks for a change in the active object detection signal if the controller receives the active object detection signal and not the passive object detection signal, and wherein the controller engages a device control system that controls operation of the washroom device if the active object detection signal is changing, and
   wherein the controller checks for a change in the passive object detection signal if the controller does not receive the active object detection signal and receives the passive object detection signal, and wherein the controller engages a device control system that controls operation of the washroom device if the passive object detection signal is not changing.

5. The sensing system of claim 1, wherein the controller checks for a change in the active object detection signal if the controller receives the active object detection signal and does not receive the passive object detection signal, and wherein the controller engages a device control system that controls operation of the washroom device if the active object detection signal is changing.

6. The sensing system of claim 1, wherein the controller checks for a change in the passive object detection signal if the controller does not receive the active object detection signal and receives the passive object detection signal, and wherein the controller engages a device control system that controls operation of the washroom device if the passive object detection signal is not changing.

7. A touchless washroom device, comprising:
   a sensing system having
      an active sensor having a transmitter and a receiver, wherein the transmitter transmits a beam into a zone,
      a passive sensor that monitors a temperature signature of the zone, and
      a controller that generates a sensing decision based on combined states of an active object detection signal from the active sensor and a passive object detection signal from the passive sensor, the sensing decision being utilized to actuate the washroom device, and a sensing decision to actuate the washroom device being made under certain conditions if one of the active object detection signal and the passive object detection signal is received, and in the absence of the other; and
   a device control system that controls operation of the washroom device based on the sensing decision.

8. The device of claim 7, wherein the device is one selected from the group consisting of a lavatory and a faucet.

9. The device of claim 7, wherein the device control system controls operation of the washroom device by controlling a valve in the washroom device.

10. The device of claim 7, wherein the active sensor is one selected from an active infrared sensor and an active visible light sensor, and wherein the passive sensor is one selected from a passive infrared sensor and a passive visible light sensor.

11. The device of claim 7, wherein the controller engages the device control system if the controller receives both the active object detection signal and the passive object detection signal, and wherein the controller does not engage the device control system if the controller receives neither the active object detection signal nor the passive object detection signal.

12. The device of claim 11, wherein the controller checks for a change in the active object detection signal if the controller receives the active object detection signal and not the passive object detection signal, and wherein the controller engages a device control system that controls operation of the washroom device if the active object detection signal is changing, and
wherein the controller checks for a change in the passive object detection signal if the controller does not receive the active object detection signal and receives the passive object detection signal, and wherein the controller engages the device control system if the passive object detection signal is not changing.

13. A method for detecting a person in a zone of a washroom device, comprising:
   transmitting a beam into the zone;
   generating an active object detection signal if a reflected beam is detected;
   monitoring a temperature signature in the zone;
   generating a passive object detection signal if a change in the temperature signature is detected;
   generating a sensing decision based on combined states of the active object detection signal and the passive object detection signal, the sensing decision being utilized to actuate the washroom device, and a sensing decision to actuate the washroom device being made under certain conditions if one of the active object detection signal and the passive object detection signal is received, and in the absence of the other; and
   controlling the washroom device based on the sensing decision.

14. The method of claim 13, wherein the controlling step engages a device control system that controls operation of the washroom device if both the active object detection signal and the passive object detection signal are generated, and wherein the controlling step does not engage the device control system if neither the active object detection signal nor the passive object detection signal are generated.

15. The method of claim 14, further comprising:
   checking for a change in the active object detection signal if the active object detection signal is generated and the passive object detection signal is not generated, wherein the controlling step includes engages a device control system that controls operation of the washroom device if the active object detection signal is changing, and
   checking for a change in the passive object detection signal if the active object detection signal is not generated and the passive object detection signal is generated, wherein the controlling step includes engaging the device control system if the passive object detection signal is not changing.

16. The method of claim 13, further comprising checking for a change in the active object detection signal if the active object detection signal is generated and the passive object detection signal is not generated, wherein the controlling step includes engages a device control system that controls operation of the washroom device if the active object detection signal is changing.

17. The method of claim 13, further comprising checking for a change in the passive object detection signal if the active object detection signal is not generated and the passive object detection signal is generated, wherein the controlling step includes engaging a device control system that controls operation of the washroom device if the passive object detection signal is not changing.

* * * * *